Figure 1:
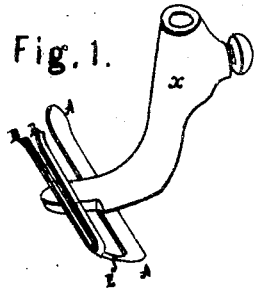
Figure 2:
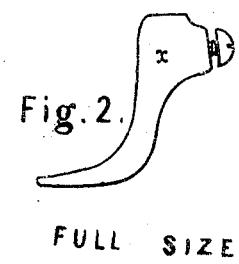
Figure 3:
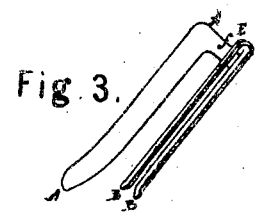
Figure 4:
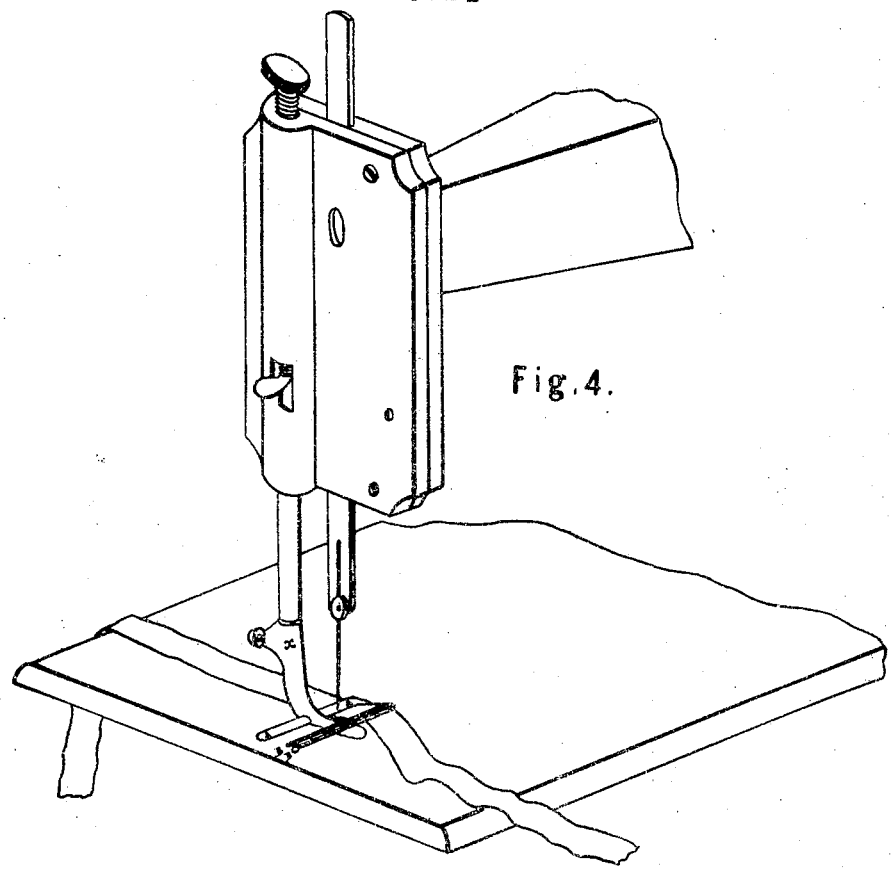

E. Bouscay Jr.
Braider & Trimmer.
Nº 99054. Patented Jan. 25. 1870

FULL SIZE

HALF FULL SIZE.

Witnesses:
David T. Hall
James H. Tenney

Inventor:
Eloi Bouscay Jr.

UNITED STATES PATENT OFFICE.

ELOI BOUSCAY, JR., OF NORWALK, OHIO.

IMPROVEMENT IN DEVICES FOR APPLYING BRAID TO FABRICS IN SEWING-MACHINES.

Specification forming part of Letters Patent No. 99,054, dated January 25, 1870; antedated January 14, 1870.

*To all whom it may concern:*

Be it known that I, ELOI BOUSCAY, Jr., of Norwalk, in the county of Huron, in the State of Ohio, have invented new and useful Improvements in Attachments for Applying Braid and Trimming to the Surface of Fabrics being Sewed in Sewing-Machines; and I do hereby declare that the following is a full and exact description thereof, reference being had to the accompanying drawing and to the letters of reference marked thereon.

In the drawings the same letters refer to the same parts in each figure.

My invention consists in a self-securing laterally-adjustable gage attached to the presser-foot of sewing-machines, substantially as hereinafter described.

My gage is constructed of a single piece, and of parts A E B B, to be hereafter more fully described.

In my gage a screw or nut is not necessary to make it fast in position. The part A A, sliding in a dovetailed groove in the bottom of the foot-piece X, and at right angles with the line of feed of the sewing-machine, being arched or curved, produces a friction sufficient to secure the gage at any point desired.

The guides B B are of great importance in effecting the perfect sewing of braid or trimming on material, as they keep the braid from getting in the way of the needle and needle-bar, enable the operator to place the parcel wherever it is convenient, and keep the braid or trimming from dropping beneath the foot-piece X, and in the proper position to be applied on the material.

The manner of operating my braid and trimming attachment is as follows: Place it on the presser-rod of the sewing-machine as a foot-piece; move the part A laterally to form a space between the part E and foot-piece X which shall correspond exactly with the width of braid or trimming you have to sew; pass the latter between the guides B B, thence between the part E and foot-piece X, and under the part A; drop the presser-foot on the material, and proceed to sew as you would any seam.

Having thus explained the construction and operation of my improvement in braider and trimmer attachment to sewing-machines, I would state that I do not claim, broadly, the attachment of a laterally-adjustable gage to the presser-foot of sewing-machines. Neither do I claim a braid or trimming guide adjustable to suit different widths of braid or trimming, such as has been invented; but I do claim—

The combination, with the presser-foot, of the self-securing adjustable attachment A E B B, constructed substantially as described, and for applying braid or trimming to the surface of fabrics.

ELOI BOUSCAY, JR.

Witnesses:
JAMES H. TENNEY,
DAVID T. HALL.